United States Patent
Shackle

Patent Number: 5,352,270
Date of Patent: Oct. 4, 1994

[54] METHOD FOR RECYCLING METAL CONTAINING ELECTRICAL COMPONENTS

[75] Inventor: Dale R. Shackle, Morgan Hill, Calif.

[73] Assignee: Valence Technology, Inc., San Jose, Calif.

[21] Appl. No.: 943,855

[22] Filed: Sep. 11, 1992

[51] Int. Cl.$^5$ .............................................. C22B 3/04
[52] U.S. Cl. ...................................... 75/419; 75/430; 423/68; 423/179.5; 423/658.5
[58] Field of Search ........................... 75/300, 419, 430; 423/179.5, 68, 658.5

[56] References Cited

U.S. PATENT DOCUMENTS

| | | | |
|---|---|---|---|
| 4,637,928 | 1/1987 | Zajac, Jr. et al. | 423/179.5 |
| 4,641,787 | 2/1987 | Petersen et al. | |
| 4,668,289 | 5/1987 | Langer et al. | |
| 4,934,610 | 6/1990 | Evans. | |
| 5,035,363 | 7/1991 | Somoza. | |

FOREIGN PATENT DOCUMENTS

A20284135  9/1988  European Pat. Off.
136547  11/1902  Fed. Rep. of Germany.

Primary Examiner—Melvyn J. Andrews
Attorney, Agent, or Firm—Nancy J. Gracey

[57] ABSTRACT

The present invention relates to methods of recycling metal containing electrical components to recover one or more metal values therefrom by comminuting the used metal containing electrical component, preferably in an inert environment, separating water soluble and insoluble materials and recovering metal or metal compounds from at least one of these materials.

32 Claims, 1 Drawing Sheet

METHOD FOR RECYCLING METAL CONTAINING ELECTRICAL COMPONENTS

TECHNICAL FIELD

The present invention relates to methods for recycling metal containing electrical components, preferably comprising metals having different solubilities in aqueous solution.

BACKGROUND

Metals used in the form of free metal or metal compounds in electrical components, such as batteries and conductors are often expensive to obtain and the recycling thereof can have economic value. Because metal and metal compounds can be corrosive, highly reactive or hazardous to plants and animals, there can be environmental value in recycling of these materials found in electrical components.

Although there has been some attempt to recycle lead acid batteries in the past, complex electrical components have not traditionally been recycled because of the logistics of concentrating a sufficient amount of recyclable electrical components in a single location and the hazards and potential complexity of the process technology. This is particularly the case when the electrical component to be recycled contains a material like lithium in metallic form which could be explosive.

Solid-state electrochemical cells are typically constructed from an alkali metal negative electrode (anode), an ionically conducting polymeric electrolyte containing an ionizable alkali metal salt, and a positive electrode (cathode). The cathode is usually formed by preparing a mixture of an active material, a metal salt, a polymeric electrolyte, and a conductive filler such as carbon black, and coating this mixture on a metal foil which functions as a current collector. Electrochemical cells formed in this fashion using lithium metal as the alkali metal anode have found wide use in numerous applications requiring portable battery power, since lithium batteries formed in this manner have a high energy density.

However, lithium metal is widely considered to be the major source of safety-related problems when lithium batteries are made rechargeable. Charging of such batteries converts lithium ions to metallic lithium, and the presence of metallic lithium in the recycle of the battery structure can result in explosion.

SUMMARY OF THE INVENTION

The present invention is directed to a method for safely treating a reactive metal containing electrical component comprising at least one of a) comminuting a reactive metal containing electrical component in a inert environment and b) extracting comminuted reactive metal containing electrical components in an inert environment. The resulting compositions of comminuted solid reactive metal containing electrical components are suitable for safely storing and shipping these materials without undesirable side reactions such as explosion.

The invention also relates to the use of one or more of the above methods in the recycling of reactive metal containing electrical components comprising the steps of:

(a) comminuting a metal containing electrical component;

(b) extracting the resulting comminuted metal containing solids with an aqueous solution to remove soluble material;

(c) acidifying the resulting aqueous insoluble metal containing residue with a strong acid; and (d) precipitating water insoluble metal salts from the aqueous acidic solution from step (c).

The invention also includes a method for recycling a metal containing electrical component comprising the steps of:

(a) comminuting a metal containing electrical component;

(b) extracting said comminuted solids with an aqueous solution;

(g) heat distilling said aqueous solution containing water soluble metal compounds; and (h) recovering metal salts from step (g).

In another embodiment of the methods of the invention, one or both of steps (g) and (h) can be combined with the steps (a)–(d). Also, combined with (a)–(d) can be (e) converting solid residues from (d) to metal oxides and/or (f) combusting solid residues form (c).

DESCRIPTION OF SPECIFIC EMBODIMENTS

Figure 1:
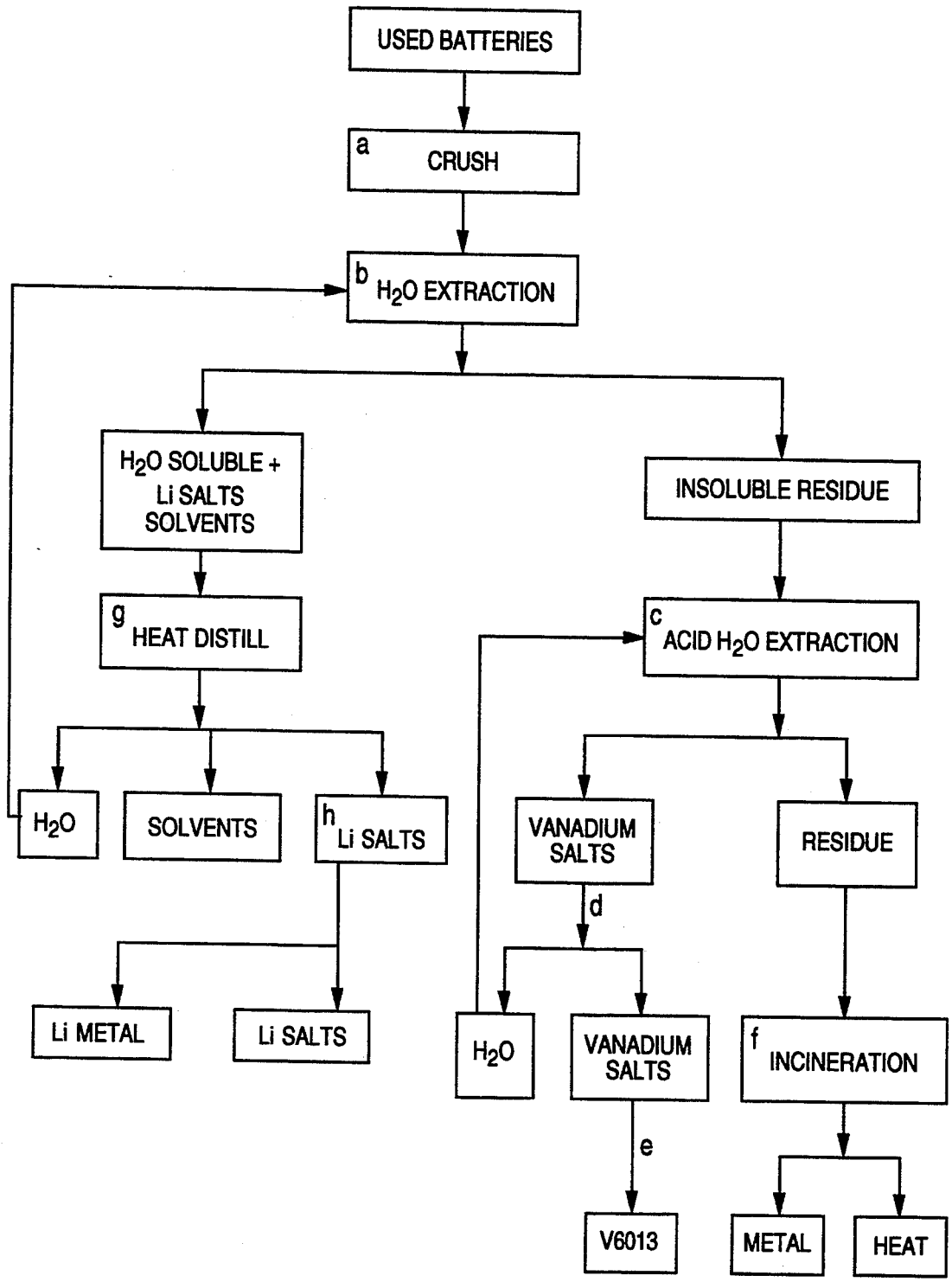
FIG. 1 is a schematic diagram of a multistep method of recycling of metal containing electrical components having different solubilities in aqueous solutions.

The invention will now be described in more detail with reference to the accompanying FIG. 1. The following terminology is provided for use in describing the invention.

By "electrical component" is meant a battery, capacitor or supercapacitor of the kind conventionally known in the art. Suitable batteries for recycle are alkaline batteries, such as lithium polymer batteries, including $Li$-$SO_2$, $Li$-$SOC_2$, $Li$-$I$ cells and the like.

"Metal containing" can include one or more metals in free metallic form or in the form of a compound or complex. By "reactive metal" is meant those metals or compounds in the electrical component that can be highly reactive under certain conditions to give undesirable vigorous reaction or undesired byproducts. The reactive metal can be contained in as the anode and/or cathode, ionizable salts, intercalation compounds or the like. Other metals or metal compounds can also be in the metal containing electrical component and these other metals or metal compounds will usually be of a less highly reactive nature so that they can be treated for recovery and recycle by conventional metallurgy practices adapted as herein disclosed and claimed for the safe handling of the reactive metal containing ingredient of the electrical component. Suitable reactive metal containing capacitors include reactive metal foil with paper, mica, polystyrene, ceramic dielectrics and reactive metal plates with vacuum, compressed gases or air as dielectrics and aluminum and tantalum electrolytes and the like.

Suitable reactive metal containing batteries include those described of the lithium type including those described in U.S. Pat. Nos. 4,888,206, 4,861,690, 4,816,357, and 4,960,655 and solid state batteries, including those containing organic polymers, including those described in U.S. Pat. Nos. 4,631,810, 4,423,125, 4,303,748, 4,908,283, 4,556,614, 5,030,527, 4,925,751, 4,818,643, 4,935,317, and 4,879,190. Such batteries can contain other ingredients such as ionizable salts, intercalation compounds, polymers, plasticizers, solvents and the like.

Ionizable alkali metal salts useful in the electrical components for recycle in the invention include those salts conventionally used in solid state electrochemical cells, such as lithium, sodium, potassium or ammonium salts. Preferred examples are sodium and lithium salts of less mobile anions of weak bases having a large anionic radius. Examples can be selected from I, Br, SNC, $ClO_4$, $BF_4$, $PF_6$, $AsF_6$, $CF_3COO$, $CF_3SO_3$, and the like. Representative specific examples of such salts include $LiClO_4$, $NaClO_4$, $LiF_3CSO_3$, $LiBF_4$ and the like.

The salt can be used up to an amount which does not exceed its solubility limit in the electrolyte. The amount will therefore vary with the nature of the liquid solvent. As a general rule, the maximum amount of salt within its solubility limit should be used to maximize the ionic conductivity of the electrolyte. In most applications, about 10 to 60 parts salt is used per 100 parts of liquid phase.

Intercalation compounds and electronically conductive materials useful in forming the cathode that is used with the anode of the present invention are well known in the art and include metal oxides, sulfides and selenides. Representative examples of intercalation compounds are $V_3O_8$, $V_6O_{13}$, $V_2O_5$, $MnO_2$, $MoO_2$, $MoS_2$, $Cr_3O_6$, $LiCoO_2$, $Li_xV_3O_8$, $TiS_2$ and the like. Preferably, the intercalation compounds is a vanadium oxide containing lithium or $LiCoO_2$. The intercalation compound preferably has a particle size of less than about 1 micron but can range up to about 20 microns. Other examples can be found in the aforementioned references, such as U.S. Pat. Nos. 4,925,752 and 4,822,701.

By "inert environment" is meant an environment which does not cause an undesired chemical reaction to occur in regard to the aqueous solution of the reactive metal containing ingredient of the electrical components to be recycled. For example, in the case of lithium and other reactive metals, such as alkali and alkaline earth metals, these metals are all very Sensitive to oxygen and water and lithium also reacts with nitrogen. Lithium reacts vigorously with water generating hydrogen which could react explosively with any oxygen present, forms $LiN_3$ with nitrogen and an oxide with oxygen. Therefore, the apparatus used for extraction and/or comminuting or the space surrounding the aqueous solution of electrical components therein must be rendered inert, e.g., be purged of oxygen, hydrogen and/or nitrogen. Accordingly, it is important to monitor the system to ensure that there is a sufficiently low hydrogen, oxygen and/or nitrogen content to prevent undesirable reactions generated from the action of the alkali or alkaline earth component, e.g., lithium, in regard to the aqueous solution of electrical components. Accordingly, an inert environment should have an oxygen and/or nitrogen content each of lower than about 1 ppm or preferably essentially be oxygen-free and/or nitrogen-free. This can be obtained by submerging the electrical component, such as the battery or particles thereof, in an aqueous solution or the like, free from contact with any oxygen and/or nitrogen at the water interface. Alternatively, continuously removing hydrogen below the water interface also aids in reducing undesirable reaction with oxygen, as does maintaining a very low pressure or vacuum or an essentially oxygen-free and/or nitrogen-free environment. Conducting the extraction or comminuting step at a sufficient contacting rate to prevent undesired side reactions is another means of maintaining an inert environment. By "sufficient contacting rate to prevent undesired side reactions" is meant preventing the aqueous solution of the reactive metal in the electrical component or particle thereof from an undesired side reaction by adjustment of the contacting rate between the aqueous solution and the electrical components in the aqueous extraction or comminuting of the reactive metal material so that the contacting is done rapidly thereby minimizing the rate and/or amount undesired side reactions, particularly a side reaction of hydrogen with oxygen, which is unsafe because of the vigor of the reaction or the kind of by-product produced. In the case of lithium, undesired side reactions of hydrogen generated in aqueous solutions can occur with oxygen as described herein and the aqueous extraction or comminuting can be conducted at a rate to reduce the amount of hydrogen generated.

By "comminuting" in step (a) is meant to reduce a substance to small, fine particles, e.g., by grinding, chipping, crushing and the like. The desired particle size can be determined by a variety of methods, the simplest being screening of the solids to allow only those of a desired maximum particle size to exit the comminuting zone to the extraction zone. A suitable final particle size can vary, of course, depending on the subsequent steps in the recycle process. By way of nonlimiting example, the particle size is usually less than about 10 mesh.

By "acidifying" or "acid leaching" is meant making a substance have an acidic pH of less than 7.0.

By "strong acid" is meant an acid having a first acid constant of about $10^3$ such as a mineral acid, hydrochloric acid, sulfuric acid and the like.

By "precipitation" is meant the separation of a substance out of a solution as a solid, e.g., by action of a chemical reagent, temperature or other conventional methods.

By "(e) converting solid residues from step (d)" is meant the conversion of water soluble metal salts into solid water insoluble salts or other insoluble metal compounds.

By "carbonaceous" is meant a component of the metal containing electrical component which contains carbon in the free elemental state, e.g., graphite, or in combined form, particularly as an organic substance, such as a polymer and/or a solvent or plasticizer.

By "combusting" in step (f) is meant oxidation of a material by contact with an oxygen containing gas, such as air or oxygen, with or without the presence of steam.

Depending on the kinds of metals in the electrical component and the form in which the metal is desired to be recovered, e.g., as free metal, oxide, salt or the like, the recycle process steps can be varied and controlled to produce one or more desired products. Steps can include various metallurgy steps such as extraction, leaching with aqueous acidic or alkaline solutions, incineration, soluble and/or insoluble salt formation, reduction, electrolysis, distillation or the like. The process for recycle is based on first extracting the comminuted solids from step (a) with an aqueous solution to separate the ingredients into an insoluble residue and an aqueous solution containing water soluble ingredients.

Accordingly, the resulting solution of crushed used batteries from step (a) can be extracted with an aqueous solution which is not strongly basic or acidic. As in the comminuting step (a), care should be exercised in this step (b) that the battery particles continue to remain submerged because, for example, in the case of lithium, hydrogen gas can be generated and explosion effects could result if battery particles meet hydrogen or an air-water interface. The use of a mesh screen located a short distance below the liquid surface is useful to keep the battery particles submerged and provide safe comminuting and/or extraction in an inert fluid environment.

The water soluble components in the comminuted battery particles from step (b) include lithium hydroxide, lithium salts, such as $LiBF_4$, water-soluble anions, such as propylene carbonate and the like. This aqueous solution from step (b) can be separated from the water insoluble residue by decanting, filtering or the like. The aqueous solution can be then treated to separate the components thereof, for example, by distillation, extraction or the like. Preferably, the aqueous solution from step (b) can be distilled in step (g) by heating to a temperature sufficient to separate the solution into at least two parts: (1) distilled aqueous solution, which is recycled to the above extraction step and (2) solid lithium components, such as salts and other lithium compounds, and (3) optionally any organic liquids distillable separately from the water phase, such as propylene carbonate which can be reclaimed for use in construction of new batteries. The lithium components from the distillation step can be recovered in step (h) as lithium salts or further separated by converting by e.g., by electrolysis or the like into free lithium metal.

The water insoluble residue from step (b) can be acidified, extracted or acid leached in step (c) with an aqueous solution of a strong acid, such as hydrochloric, sulfuric acid or the like to form an aqueous acidic solution of soluble vanadium salts, including lithium metavanadate ($LiVO_3$). Most vanadates are, however, insoluble and these include vanadates of mercurous, lead, barium and ammonium salts. This insolubility can be used to advantage in recovering vanadium for recycle. For example, the solution of soluble vanadate can be treated in step (d) with a salt capable of forming insoluble vanadates, such as ammonium chloride or other halide to precipitate insoluble vanadium salts, such as ammonium metavanadate ($NH_4VO_3$) as yellow crystals. These insoluble salts can be separated by decanting, filtering or the like. The remaining aqueous phase can be recycled to the above acid extraction step (c). Other solids formed in acidic solution include vanadium sulfide ($V_2S_5$). Most of the vanadate salts can be treated with oxygen containing gas in step (e) under incineration conditions to convert them to a vanadium oxides, such as $V_6O_{13}$, which can be reclaimed for use in manufacturing new batteries.

The insoluble residue from the acid extraction step (c) can be discarded or optionally recovered as metal oxides and/or free metals, such as nickel, aluminum, copper or the like, by incinerating the carbonaceous portion of the insoluble residue in step (f). The resulting heat generated in step (f) can be used in the step (g) of heat distillation of the aqueous solution of water soluble components as discussed above.

For incineration, hot oxygen containing gas, $O_2 \pm$ steam, is passed through the insoluble residue and the residue ignited and allowed to incinerate by maintaining a sufficiently high temperature, oxygen content until substantially all the carbonaceous materials in the insoluble residue are incinerated leaving primarily free metals or metal oxides. The incineration, when conducted, usually takes place at a temperature above about 350° C. The pressure will usually be about 0.9 to about 1.5 atm absolute.

The free metals and metal oxides from the incineration step can be reclaimed as is depending on the purity and use or subjected to other conventional metallurgy processes to recover specific metal or metal oxide components.

Alternatively, the water-insoluble residue from step (b) can be directly incinerated in step (f) without acid extraction in which case the vanadium components can be directly converted into vanadium oxides but can be admixed with other metal and/or metal oxide components.

Heat generated in the incineration can, if desired, be transferred to the heat distillation step to provide all or part of the heat used in the heat distillation.

Most metals, including lithium, copper, nickel, and the like, can be readily recovered by electrolysis of solutions their ions by conventional electrolysis separation techniques, such as those described in Willard et al, Elemental Quantitative Analysis (3rd Ed.) d. Van Nostrand Co, Inc. (1940) N.Y., N.Y.

Reduction can also be used to treat metal compounds contained in liquid solutions or solid residues. In such case, the solution of solid material can be contacted with an excess of reducing agent, such as hydrogen containing gas to reduce the metal compound to free metal or to a compound wherein the metal has a lower valence state.

Tantalum present in capacitors can form soluble salts with potassium, e.g., $K_8Ta_6O_{19}$. The acids of tantalum are precipitated from soluble tantalum salts with acids. Fusion of tantalum with alkaline bisulfite solution can be followed by hydrolysis with a strong acid such as hydrochloric acid or fusion with hydroxide or carbonate followed by treatment with an alkaline solution to give pentoxides.

Unless otherwise indicated, the temperatures and pressures used in the process steps are normal, e.g., from about 10 to about 20° C. and about 1 atm absolute.

Periodic analysis of the starting materials, residues and the aqueous (acidic or alkaline) solutions entering and exiting the extraction, leaching or other process steps is used to determine the concentration of water soluble alkali and alkaline earth metals, oxides, sulfides and selenides as well as nickel, copper, aluminum and transition metal components, such as vanadium, molybdenum, chromium and the like and is useful to regulate the concentration and pH of reagent solutions which are varied dependent on the concentration of the desired metal components to be recycled. Such determinations are readily determinable by those of skill in the art.

The polymeric network in the electrical components for recycle can be interpenetrated by the ionically conducting liquid and which serves as a matrix for an electrolyte for holding carbon to form a composite electrode, can be formed from a conductive polymer or can be a supportive matrix of a non-conductive polymer.

Examples of polymers which may be used to from conductive polymeric networks are described in U.S. Pat. No. 4,303,748. These polymers have repeating units containing at least one heteroatom such as an oxygen or nitrogen atom. They can be represented as polymers having the repeating unit

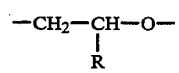

wherein R is hydrogen or a group $R_a$, —$CH_2OR_a$, —$CH_2OR_eR_a$, or —$CH_2N(CH_3)_2$ in which $R_a$ is an alkyl group containing 1 to 16 carbon atoms and preferably 1 to 4 carbon atoms or a cycloalkyl group containing 5 to 8 carbon atoms and $R_e$ is an ether group of formula —$[CH_2—CH_2O]_p$— wherein p is a number from 1 to 100, preferably 1 or 2; or having the repeating unit

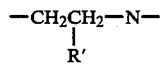

wherein R' is $R_a$ or $R_eR_a$, as defined above; or having the repeating unit

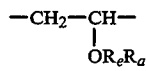

wherein $R_e$ and $R_a$ are defined above. Copolymers of the above polymers can also be useful.

In the electrodes of the present invention, these polymers can be cross-linked to form a network which is sufficiently rigid to provide physical integrity to the composite electrode as the cell is charged, discharged, and recharged. These polymers can be crosslinked in a number of ways. For example, U.S. Pat. No. 4,357,401 to Andre et al. discloses PEO-PPO copolymers which are cross-linked by ethylene diamine. Where the polymer includes moieties of primary or secondary alcohols or amines, the polymer may be cross-linked by reaction with a cross-linking agent such as a polyisocyanate. For example, polyethylene oxides can also be cross-linked by using a cross-linking agent such as poly(ethylene glycol) diacrylate and a thermal free radical initiator such as 2,2'-azobis(2-methylpropionitrile) as described in U.S. Pat. No. 4,830,939. See also U.S. Pat. No. 3,734,876. Radiation and thermally initiated free radical addition reactions can also be used to form the cross-linked polymeric network such as obtained by reacting a low molecular weight polyethylene glycol with acrylic or methacrylic acid, acrylated epoxies, e.g., Bisphenol A epoxy diacrylate, polyester acrylates, copolymers of glycidyl ethers and acrylates or a vinyl compound such as N-vinylpyrrolidone, polyethylene glycol-300 diacrylate (average PEO molecular weight about 300), polyethylene glycol-480 diacrylate (average PEO molecular weight about 480) and the corresponding methacrylates. Optionally, a radiation curable comonomer is in the composition to reduce the glass transition temperature and improve the conductivity of the polymer, such as tetrahydrofurfuryl acrylate, tetrahydrofurfuryl methacrylate, methoxypolyethylene glycol mono-methacrylate, 2-ethoxyethyl acrylate, 2-methoxyethyl acrylate or cyclohexyl methacrylate may be used for this purpose. Triacrylates such as TMPTA, trimethylolpropane ethoxylated triacrylates (TMPEOTA) or trimethylolporpanepropoxy triacrylate may be used to introduce cross-linking of the polymer. Examples of cross-linked non-conductive supportive polymers are described in U.S. Pat. No. 4,654,279 to Bauer et al. and include epoxies, polyurethanes, polymethacrylates, polyacrylates, polyacrylonitrile, and polystyrene.

The radiation inert liquids which form the ionically conductive liquid interpenetrating phase can be any low volatility aprotic polar solvent. Preferably, these materials are characterized by a boiling point greater than about 80° C. Low volatility simplifies manufacture and improves shelf life. Representative examples are acetonitrile, thionyl chloride, propylene carbonate, gamma-butyrolactone, 1,3-dioxolane, and 2-methyltetrahydrofuran. Less polar solvents having heteroatoms capable of bonding alkali metal cations are also useful. Polyethylene glycol dimethyl ether (PEGDME) is one such example. Glymes such as tetraglyme, hexaglyme, triglyme, and heptaglyme are also desirable solvents. Preferably, the liquid is propylene carbonate.

A conductive filler can be included in the cathode and is usually carbon black. Certain conductive polymers (which are characterized by a conjugated network of double bonds) like polypyrol and polyacetylene can also be sued for this purpose.

The anode can be prepared by coating the mixture on a current collector, such as a metal foil member, and curing the composition. A typical foil is lithium foil or lithium coated on aluminum, nickel or copper foil or the like. The composition can be coated by solvent coating using conventional coating techniques such as a doctor blade or an extrusion method can be used. The anode is coated in a thickness of about 10 to 100 microns and typically 30 to 60 microns.

Anode compositions in accordance with the present invention contain about 10 to 50 parts by weight of the amorphous carbon and preferably from about 25 to about 35 parts, about 0 to 10 parts of a conductive filler, about 0 to 20 parts of an ionizable metal salt, about 45 to 80 parts of an ionically conducting liquid, and about 20 to 55 parts of the cross-linked polymer, preferably 25 to 40 parts, per 100 parts of the final polymer electrolyte composition (all parts by weight).

In one embodiment of batteries for recycle in the present invention, a carbon/polymer composite anode prepared by the aforementioned method is coated with a polymer host network electrolyte as previously described. The resulting composite electrode is cured by electron beam radiation. A polymer composite cathode is formed by coating a $V_6O_{13}$/carbon/polymer composite onto a nickel substrate and curing with electron beam radiation. The cured composite cathode is lithiated by electrochemical means and laminated onto the anode/electrolyte composite surface. The resulting electrochemical cell has an open circuit voltage of about 3 volts and can be cycled between that voltage and 0 volts repeatedly.

Another embodiment of batteries for recycle in the present invention utilizes a carbon/polymer composite electrode as both the anode and the cathode. The electrodes are prepared as described above and laminated with a polymer host network electrolyte therebetween. Prior to lamination, the electrode to be utilized as the anode is lithiated by electrochemical means. The resulting electrochemical cell has an open circuit voltage of about 1.5 volts and can be cycled between that voltage and 0 volts repeatedly.

The invention will now be illustrated by the following examples, which should not be regarded as limiting the invention in any way.

EXAMPLE 1

A used lithium thin layer battery for recycle comprises a conductive carbon filler, a lithium anode, a transition metal oxide (intercalation compound; $V_6O_{13}$) polymer composite as a cathode and an electrolyte, preferably in solid form and including a dissolved lithium salt, $LiBF_4$, propylene carbonate as plasticizer and a current collector of nickel or copper foil. Unless otherwise indicated, the temperatures and pressures used in the process steps are normal, e.g., from about 10 to about 20° C. and about 1 atm.

The used battery is comminuted by crushing and pulverizing in a pulverizing apparatus under conditions inert to the components of the battery, preferably in an aqueous solution where oxygen is less than 1 ppm until the desired particle size is obtained, e.g., about 10 mesh size. Part of the solution of crushed batteries is shipped to a distant location for further processing with greater safety and part of the crushed batteries in solution is further processed at the same location.

For further processing, the resulting solution of crushed used battery is extracted with an aqueous solution. Care is exercised in this step that the lithium containing battery particles continue to remain submerged because hydrogen gas can be generated and explosion effects could result if battery particles meet an air-water interface. A mesh screen is located a short distance below the liquid surface to keep the battery particles submerged and provide safe aqueous extraction in an inert environment.

The water soluble components include lithium hydroxide, lithium salts, such as $LiBF_4$, water-soluble anions, such as propylene carbonate and the like. This aqueous solution is separated from the water insoluble residue by filtering. The aqueous solution is then treated to separate the components thereof by distillation optionally followed by extraction. The aqueous solution is distilled by heating to a temperature sufficient to separate the solution into three parts: (1) distilled water, which is recycled to the above extraction step, (2) solid lithium components, salts and other lithium compounds, and (3) organic liquids distillable separately from water, such as propylene carbonate which can be reclaimed for use in construction of new batteries. Part of the lithium components are recovered as lithium salts and part of the lithium components are further separated by treatment with excess sulfuric acid converts lithium ingredients into lithium sulfate which is then treated with sodium carbonate to form lithium carbonate and then with hydrochloric acid to form lithium chloride which converted by electrolysis into free lithium metal.

The water insoluble residue from step (b) is further extracted with an aqueous solution of a strong acid, such as hydrochloric, sulfuric acid or the like to form an aqueous acidic solution of soluble vanadium salts, including lithium metavanadate ($LiVO_3$) o The solution of soluble vanadate is treated with a neutral salt, such as ammonium chloride or other halide to precipitate insoluble vanadium salts, such as ammonium metavanadate ($NH_4VO_3$) as yellow crystals, which are separated by filtering. The aqueous phase is recycled to the above acid extraction step. The resulting water insoluble vanadate salts are treated with oxygen containing gas under incineration conditions to convert them to a vanadium oxides, such as $V_6O_{13}$, which are reclaimed for use in manufacturing new batteries.

The insoluble residue from the acid extraction step is incinerated to recover as metal oxides and/or free metals, such as nickel, aluminum, copper or the like, by incinerating the carbonaceous portion of the insoluble residue. The resulting heat generated is recycled and used in the step of heat distillation of the aqueous solution of water soluble components as discussed above.

Alternatively, some of the water-insoluble residue can be directly incinerated without acid extraction in which case the vanadium components is directly converted into vanadium oxides but is admixed with other metal and/or metal oxide components.

The combustion or incineration is conducted, usually takes place at a temperature above about 350° C. The pressure is about 0.9 to about 1.5 atm absolute. For incineration, hot oxygen containing gas, $O_2\pm$ steam, is passed through the insoluble residue and the residue ignited and allowed to incinerate by maintaining a sufficiently high temperature, oxygen content until substantially all the carbonaceous materials in the insoluble residue are incinerated leaving primarily free metals or metal oxides. Part of these metals are reclaimed as is depending on the purity and use and part are subjected to other conventional metallurgy processes to recover specific metal or metal oxide components. Heat generated in the incineration is transferred to the heat distillation step to provide all or part of the heat used in the heat distillation.

EXAMPLE 2

Following methods similar to those described in Example 1 above, tantalum present in capacitors is recovered from the aqueous solution from step (b) in form soluble salts with potassium, e.g., $K_8Ta_6O_{19}$. The acids of tantalum are precipitated from salts with acids. Fusion of tantalum with bisulfite solution can be followed by hydrolysis with a strong acid such as hydrochloric acid or fusion with hydroxide or carbonate followed by treatment with an alkaline solution to give pentoxides.

Following procedures similar to those described above, other reactive metal containing electrical components, including capacitors and supercapacitors, can be recycled to yield valuable metal or metal compounds and optionally useful heat.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A method for safely treating a reactive metal containing electrical component comprising at least one of:
   a) comminuting a reactive metal containing electrical component in an aqueous solution in an inert environment, and
   b) extracting comminuted reactive metal-containing electrical components with an aqueous solution in an inert environment to obtain an aqueous solution containing water-soluble ingredients and a water-insoluble resides,
   wherein said inert environment is provided by a member selected from the group consisting of an environment essentially oxygen-free and nitrogen free, an environment at a very low pressure or a vacuum, controlling the rate of contacting said electrical component with said aqueous solution and by continually removing hydrogen below the aqueous solution interface thereby preventing undesirable side reactions.

2. The method according to claim 1, wherein said reactive metal containing electrical component comprises a battery or a conductor.

3. The method according to claim 1, wherein said component comprises metallic lithium.

4. The method according to claim 1, wherein said inert environment is by maintaining said electrical components submerged in an aqueous medium to prevent contact of the components with oxygen at the water interface.

5. A method for recycling a metal containing electrical component comprising the steps of:
   (a) comminuting a metal containing electrical component;
   (b) extracting the resulting comminuted metal containing solids with an aqueous solution to remove soluble material;
   (c) acidifying the resulting aqueous insoluble metal containing residue with a strong acid; and
   (d) precipitating water insoluble metal salts from the aqueous acidic solution from step (c).

6. The method according to claim 5, wherein said metal containing electrical component is a battery or conductor.

7. The method according to claim 6, wherein said metal containing electrical component comprises at least one metal, a metal oxide, sulfide or selenide.

8. The method according to claim 5, wherein said acid in step (c) is sulfuric acid or hydrochloric acid.

9. The method according to claim 8, wherein said precipitation in step (d) is by formation of water insoluble salts.

10. The method according to claim 5, further comprising (e) converting solid residue from step (d) to metal oxides.

11. The method according to claim 5, further comprising step (f) combusting solid residue from step (c).

12. The method according to claim 11, wherein the solid residue from step (f) is further treated to recover at least one free metal or a metal compound.

13. The method according to claim 12, wherein free metal is at least one metal selected from aluminum, nickel and copper.

14. The method according to claim 11, wherein heat is recovered from step (f).

15. A method for recycling a metal containing electrical component comprising the steps of:
   (a) comminuting a metal containing electrical component;
   (b) extracting said comminuted solids with an aqueous solution;
   (g) heat distilling said aqueous solution containing water soluble metal compounds; and
   (h) recovering metal salts from step (g).

16. The method according to claim 15, wherein said electrical component is a battery or conductor.

17. The method according to claim 15, wherein said metal is lithium.

18. The method according to claim 17, wherein step (a) is conducted in an inert environment.

19. The method according to claim 15, further comprising recovering at least one free metal or metal salt from step (h).

20. A method for recycling a metal containing electrical component comprising the steps of:
   (a) comminuting a metal containing electrical component;
   (b) extracting the resulting comminuted metal containing solids with an aqueous solution to remove soluble material;
   (c) acidifying the resulting aqueous insoluble metal containing residue with a strong acid; and
   (d) precipitating water insoluble metal salts from the aqueous acidic solution from step (c).
   (g) heat distilling said aqueous solution containing water soluble metal compounds; and
   (h) recovering metal salts from step (g).

21. The method according to claim 20, wherein said metal containing electrical component is a battery or conductor.

22. The method according to claim 21, wherein said metal containing electrical component comprises at least one metal, a metal oxide, sulfide or selenide.

23. The method according to claim 20, wherein said acid in step (c) is sulfuric acid or hydrochloric acid.

24. The method according to claim 23, wherein said precipitation in step (d) is by formation of water insoluble salts.

25. The method according to claim 20, further comprising (e) converting solid residue from step (d) to metal oxides.

26. The method according to claim 20, further comprising step (f) combusting solid residue from step (c).

27. The method according to claim 26, wherein the solid residue from step (f) is further treated to recover at least one free metal or a metal compound.

28. The method according to claim 27, wherein free metal is at least one metal selected from aluminum, nickel or copper.

29. The method according to claim 27, wherein heat is recovered from step (f).

30. The method according to claim 15, wherein said metal is lithium and vanadium or compounds thereof.

31. The method according to claim 20, wherein step (a) is conducted in an inert environment.

32. The method according to claim 20, further comprising recovering at least one free metal or metal salt from step (h).

* * * * *